United States Patent
Bates

(10) Patent No.: US 8,036,349 B2
(45) Date of Patent: Oct. 11, 2011

(54) ORDERING TELEPHONE MESSAGES LEFT FOR A USER

(75) Inventor: Cary Lee Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 12/058,322

(22) Filed: Mar. 28, 2008

(65) Prior Publication Data
US 2009/0245484 A1    Oct. 1, 2009

(51) Int. Cl.
*H04M 1/64* (2006.01)
(52) U.S. Cl. ............... 379/88.19; 379/88.21; 379/88.11
(58) Field of Classification Search ............ 379/88.19, 379/88.21, 88.11
See application file for complete search history.

(56) References Cited

U.S. PATENT DOCUMENTS

| 6,335,962 B1* | 1/2002 | Ali et al. ............ 379/88.11 |
| 2002/0080928 A1* | 6/2002 | Bates et al. ............ 379/88.21 |

OTHER PUBLICATIONS

CT Everywhere!, downloaded from http://www.ctexpert.com/vision.html on Jan. 15, 2008, pp. 1-4.

* cited by examiner

*Primary Examiner* — Fan Tsang
*Assistant Examiner* — Van D Huynh
(74) *Attorney, Agent, or Firm* — Wood, Herron & Evans, LLP

(57) ABSTRACT

A method that associates the first telephone number of a first user with a second telephone number of a second user that has a relationship with the first user; tracks incoming and outgoing telephone calls; and stores a plurality of telephone messages received by the first user. For each telephone message, the method assigns such telephone message to one of first, second, and third groups; and sorts the plurality of telephone messages for playback. By doing so, the telephone messages may be prioritized such that the first user may be able to more quickly determine whether or not the first user should return a telephone message, often reducing the number of unnecessary telephone calls and improving efficiency.

11 Claims, 4 Drawing Sheets

| | NUMBER | MESSAGE BIT | CALL RETURNED | CALL ANSWERED | TIME |
|---|---|---|---|---|---|
| 590 | 555-1212 | 0 | 0 | 0 | ... |
| 600 | 888-7777 | 1 | 0 | 0 | ... |
| 610 | 111-1111 | 0 | 1 | 0 | ... |
| 620 | 333-3333 | 0 | 0 | 1 | ... |

ORDERING TELEPHONE MESSAGES LEFT FOR A USER

FIELD OF THE INVENTION

The invention relates to telephones and telephone systems, and in particular, to the playback of telephone messages on such systems.

BACKGROUND OF THE INVENTION

Telephones or phones have profoundly changed many aspects of contemporary society, and have become an increasingly important tool for communicating with others, both for personal and business use. Telephones are available in a wide array of shapes and sizes, operate in variety of ways (e.g., via cells and cell towers, satellites, fiber optics, etc), and may be portable (e.g., cellular phones or mobile phones) or non-portable (e.g., a "landline").

A telephone is typically associated with a telephone number, and a user signs up for a service plan (e.g., cell phone plan) to be able to use his or her telephone to make and receive telephone calls. Typically, when a caller calls a callee, the callee may answer the incoming call, or may miss the incoming call. If the callee misses the incoming call, the callee may return the missed incoming call by placing an outgoing call to the caller.

Many telephones also include voicemail and caller identification or ID. With voicemail, a caller may be able to record a telephone message for a callee who is not answering his or her telephone. The callee may then listen to the voicemail at his or her convenience, and return the telephone call. The telephone messages are usually ordered based upon the time they were left.

With caller ID, the telephone number associated with an incoming call is displayed to the callee on his or her telephone. The name associated with that telephone number may also be displayed. Thus, this feature may indicate the telephone number associated with an incoming call, as well as the telephone number associated with a missed incoming call from the caller. Based on the missed caller ID information, the callee may the return the caller's telephone call.

Some systems also combine caller ID and voicemail functionality. For example, many voicemail systems also indicate to a callee the telephone number associated with a telephone message that was left for a callee.

Although voicemail and caller ID may allow users to personally know if there are any telephone messages on their phones, and missed telephone calls to be returned, one problem that may arise occurs when the caller makes multiple phone calls to different callees about the same topic. Although each callee may know whether he or she returned the call, they will generally not know whether the other callee has returned the call.

For instance, there are some arrangements, especially in small businesses, where co-workers (e.g., partners) use their own cell phones for business. Consider a real estate agent A and a real estate agent B who are working together, and both of their cell phone numbers are on the for sale signs and on the brochures. Oftentimes, a prospective buyer calls one of them, gets no answer, and then goes on to call the other. As a result, both agents may have missed calls and telephone messages from the potential buyer asking the same question, and both agents will likely return the call. Typically, both agents will listen to their telephone messages in order, and contact the callers in that order. As real estate agent A does not know that a potential buyer also called real estate agent B, and does not know whether real estate agent B already returned the telephone call, real estate agent A may waste his time returning a telephone call that real estate agent B has already returned.

This scenario is common when a partner has been away from his or her phone for a while, for example, with other customers. Upon checking his phone, real estate agent A may often have a list of missed calls and messages to return. If real estate agent A starts listening to the messages and returning calls in the order they were received, he may find that his partner has already responded to many of them, and that real estate agent A has thus wasted his time listening to the message, taking notes, looking up the information, and returning the calls when he could have been processing messages that real estate agent B had not handled. On a larger scale, this scenario may lead to a lot of wasted time, higher costs, and inefficiency.

A need therefore exists in the art for improving telephones, and in particular, a more intelligent approach for organizing telephone messages to enable users to more efficiently return telephone calls.

BRIEF SUMMARY OF THE INVENTION

The invention addresses these and other problems associated with the prior art by providing a method that associates the telephone numbers of related users with one another for the purpose of intelligently sorting messages left for one user based upon whether originating parties of such messages have also called related users and/or the related users have already returned the originating parties' calls. Thus, for example, in the aforementioned real estate scenario, if a prospective buyer leaves a message for one real estate agent, but that real estate agent's partner has already returned the prospective buyer's call, other, more important messages may be prioritized over that message during playback to the real estate agent.

Consistent with one aspect of the invention, a method associates a first telephone number of a first user with a second telephone number of a second user that has a relationship with the first user; tracks incoming and outgoing telephone calls; and stores a plurality of telephone messages received by the first user. For each telephone message, the method assigns the telephone message to one of first, second, and third groups; and sorts the plurality of telephone messages for playback. The message is assigned to the first group if it is determined that no incoming telephone call was placed to the second user from the associated originating user at a similar time as such telephone message was left. The message is assigned to the second group if it is determined that an incoming telephone call was placed to the second user from the associated originating user at a similar time as such telephone message was left, but that the second user has not been in contact with the associated originating user since such telephone message was left. The message is assigned to the third group if it is determined that an incoming telephone call was placed to the second user from the associated originating user at a similar time as such telephone message was left, and that the second user has been in contact with the associated originating user since such telephone message was left. By doing so, the telephone messages may be prioritized such that the first user may be able to more quickly determine whether or not the first user should return a telephone message, often reducing the number of unnecessary telephone calls and improving efficiency.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION OF THE INVENTION

Embodiments consistent with the invention may associate telephone numbers, track telephone calls from these telephone numbers, and store telephone messages, assign telephone messages, and sort telephone messages. Those of ordinary skill in the art will appreciate that various modifications may be made, for instance, the act of sorting may inherently assign telephone messages to groups.

Figure 1:
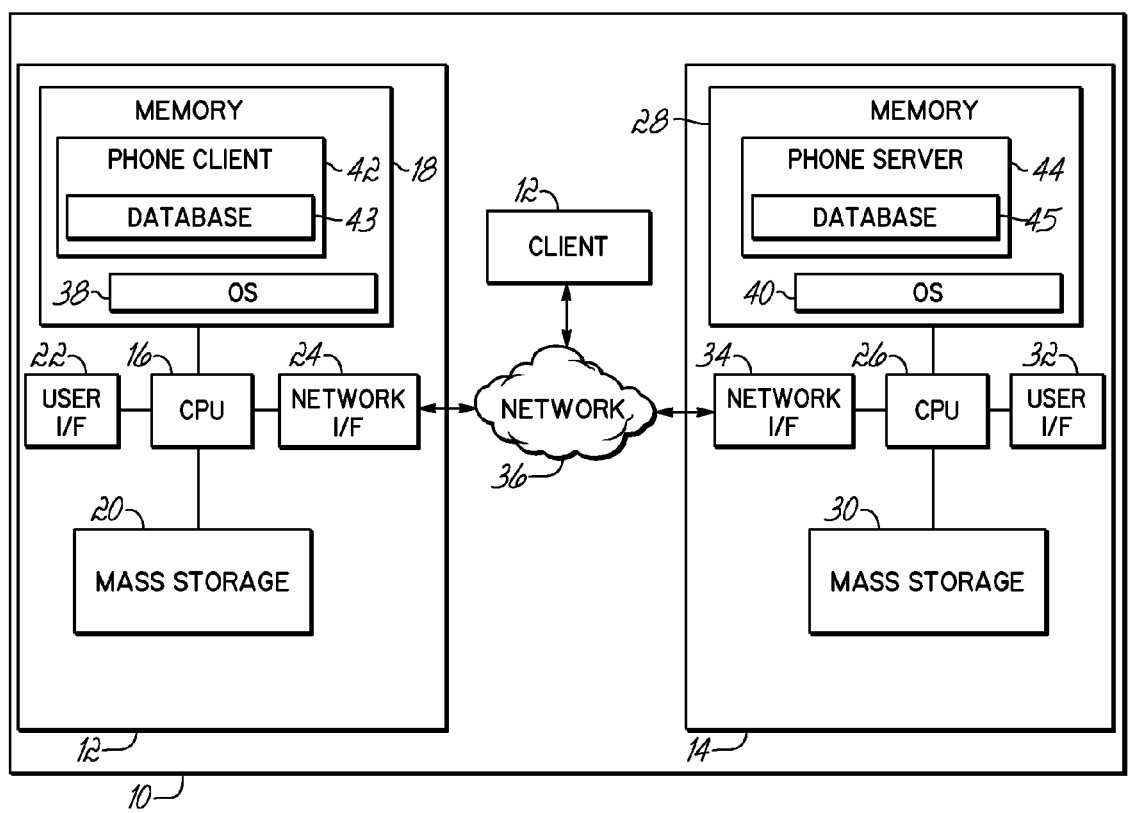
FIG. 1 is a block diagram of a client-server implementation of a telephone system consistent with the principles of the present invention.

Turning now to the Drawings, wherein like numbers denote like parts throughout the several views, FIG. 1 illustrates an exemplary telephone system or phone system 10 consistent with the principles of the present invention, implemented as a client-server based computer system or environment. System 10 includes at least one apparatus, e.g., one or more client computers 12 (e.g., phone client) and one or more server computers 14 (e.g., phone server). For the purposes of the invention, each computer 12, 14 may represent practically any type of computer, computer system or other programmable electronic device capable of functioning as a client and/or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14. Furthermore, in some embodiments, system 10 may even be implemented as a peer-to-peer system or environment, where computer 12 may function as a client and/or server and computer 14 may function as a client and/or server.

Computer 12 typically includes a central processing unit 16 including at least one microprocessor coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12. In particular, resident in memory 18 is a computer program such as a phone client 42, and stored in phone client 42 may be a database 43. Database 43 may be utilized to store information for the telephone associated with phone client 42. Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). User I/F 22 also may have a telephone such as a cellular phone, a landline phone, a portable phone, a non-portable phone, etc. Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

In a similar manner to computer 12, computer 14 includes a CPU 26, memory 28, a computer program such as phone server 44, a database 45 stored in phone server 44, mass storage 30, user interface 32 and network interface 34. Database 45 stores caller ID information (e.g., as a caller ID information table), billing information, information about calls returned and/or received by a user, telephone messages, information about which telephone numbers are associated, information about which users are associated, information about telephone plans, etc. However, given the nature of computers 12 and 14 as client and server, in many instances computer 14 will be implemented using a multi-user computer such as a server computer, a midrange computer, a mainframe, etc., while computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention. Computers 12, 14 are generally interfaced with one another via a network 36, which may be public and/or private, wired and/or wireless, local and/or wide-area, etc. Moreover, network 36 may represent multiple, interconnected networks. In the illustrated embodiment, for example, network 36 may include the Internet.

Each computer 12, 14 operates under the control of an operating system 38, 40, and executes or otherwise relies upon various computer software applications, components, programs, objects, modules, data structures, etc. (e.g. phone client 42 and phone server 44). Moreover, various applications, components, programs, objects, modules, etc. may also execute on one or more processors in another computer coupled to computer 12, 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include, but are not limited to, physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization (e.g., components may be added and/or omitted) and allocation of program functionality described herein.

In the context of the invention, a first user and a second user may ask their telephone service provider, which may be the same provider or different providers, to associate their telephone numbers. Alternatively, the first and second users may sign their telephones for a telephone plan that associates them as partners for each other. Nonetheless, phone server 44 may start to store information about these telephone numbers in database 45 in a caller ID information table and track incoming and outgoing telephone calls for both telephone numbers. The incoming and outgoing telephone calls may be tracked via the caller ID information and/or billing information in database 45. Furthermore, the telephone messages received by the first user in response to missed telephone calls to the first number may be stored in database 45 of phone server 44.

Based on the tracking, server 44 may be able to assign the telephone messages to a group, sort the telephone messages for playback using the assigned groups, and/or indicate the groups during playback. Furthermore, the telephone numbers of the missed calls associated with the telephone messages may be displayed for the first user. In particular, the same groups assigned to the messages may be assigned to the telephone numbers, and an icon indicating the group may be displayed with each telephone number. The displayed telephone numbers may also be sorted based on the groups. In some embodiments, however, the groups may be first assigned to the telephone numbers and then used for the corresponding messages. The telephone numbers need not be sorted in other embodiments. Moreover, in some embodiments, the same or similar approach may be utilized to appropriately flag to the first user missed telephone calls by displaying the telephone numbers and icons, even when not telephone message is left.

In particular, server 44 may generally be able to determine which caller ID entries should be flagged to the first user and which flags to indicate to the first user. In some embodiments, for instance, when the first user seeks to display the caller id info on his or her telephone and/or playback telephone messages, a request may be sent to server 44 to get any information on the second user's actions (e.g., has the second user been in contact), and based on this information, the telephone numbers and/or telephone messages are appropriately flagged to indicate contact by the second user, to indicate no contact by the second user, etc.

As such, those of ordinary skill in the art may appreciate that the first user may be assisted in determining which telephone messages to return first. Furthermore, the first user may be assisted in determining which telephone messages to call the second user about before returning the call. Moreover, those of ordinary skill in the art will appreciate that the more telephone numbers that are associated, the greater the reduction in unnecessary telephone calls and improved efficiency.

Those skilled in the art will recognize that the exemplary system illustrated in FIG. 1, however, is not intended to limit the present invention. Indeed, those skilled in the art will recognize that other alternative hardware and/or software environments may be used without departing from the scope of the invention.

Figure 2:
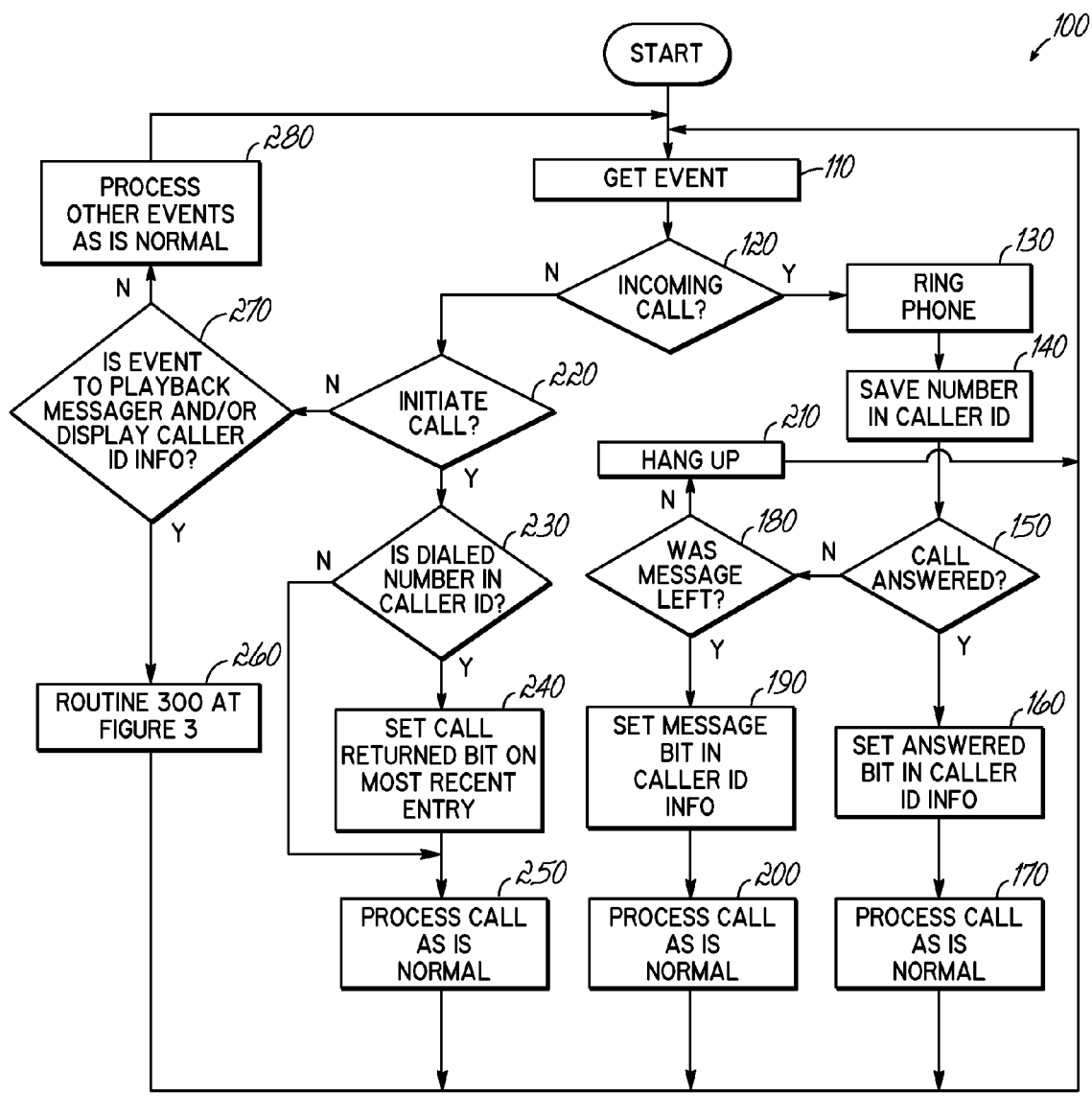
FIG. 2 is a flowchart of an exemplary routine for populating caller ID information for assigning a telephone message to a group.

Turning now to FIG. 2, FIG. 2 is a flowchart of an exemplary routine 100 for populating caller ID information for assigning telephone message to a group. Starting with block 110, a telephone related event is received in block 110. If the event is an incoming call, control passes to block 120, and then to block 132 to ring the phone. The telephone number associated with the incoming call is saved as a record in caller ID information table in block 140.

Block 150 determines whether or not the incoming call was answered. If answered, block 160 sets the answered bit in the caller ID information table to on with a value of 1. Next, block 170 processes the call as is normal and control may pass to block 110 to get additional events. However, if the call was not answered, control passes to block 180 to determine whether or not a message was left. If a message was left, block 190 sets the message bit to on with a value of 1 in the caller ID information table. Next, block 200 processes the call as is normal and control may pass to block 110 to get additional events. Otherwise, control passes to block 210 if the caller hung up, and then to block 110 to get additional events.

Returning to block 120, if the event was not an incoming call, control may pass to block 220 to determine if the event was the initiation of a call (i.e., outgoing call). If it is an outgoing call, control may pass to block 230 to determine if the dialed telephone number is in the caller ID information table. If it is, control passes to block 240 to set the call return bit to on for the most recent entry. Next, control passes from block 240, or from block 230, to block 250 to process the outgoing call as is normal, and then to block 110 to get additional events.

However, if the event in block 220 was not to initiate a telephone call, control may pass to block 270 to determine if the event is to playback messages and/or display caller ID information. If it is, control passes to block 260 to routine 300 at FIG. 3, and then to block 110 to get additional events. If the event was neither of these, control passes to block 282 to process any other events as is normal, and then to block 110 to get additional events.

Figure 3:
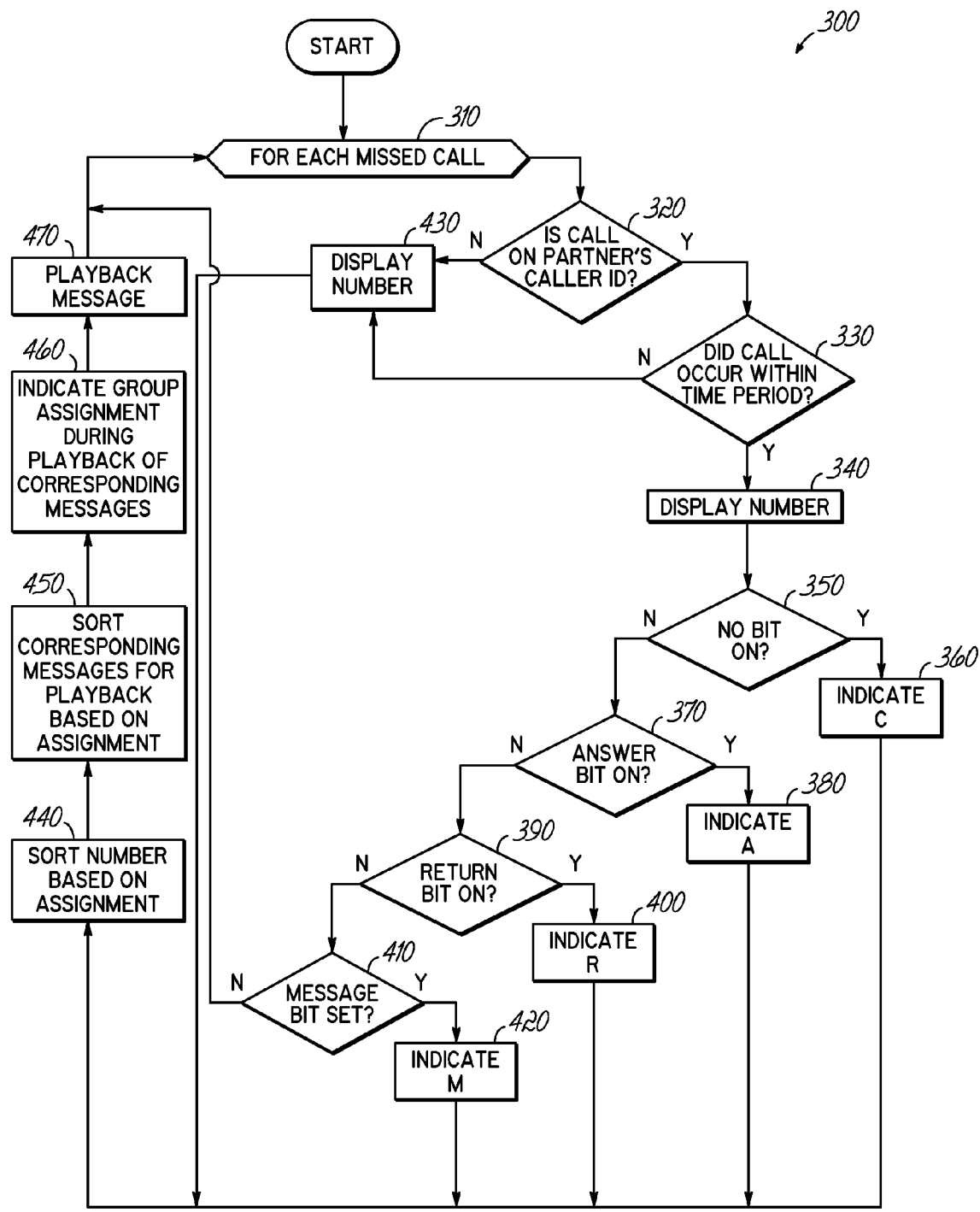
FIG. 3 is a flowchart of an exemplary routine for indicating the assigned groups.

Turning to FIG. 3, FIG. 3 is a flowchart of an exemplary routine 300 for indicating to a user the assigned groups. In particular, the groups may be assigned to the telephone messages and/or telephone numbers of missed calls via the bits in the caller ID information table consistent with the principles of the present invention.

Starting with block 310, block 310 initiates a FOR loop for each missed call in the caller ID information table. Next, block 320 determines whether the call is also on the partner's (i.e., the second user's) caller ID. In some embodiments, the second user's and the first user's caller ID information may be kept in a single caller ID information table, while in other embodiments, separate tables may be kept and compared. If not, the telephone number associated with that call is displayed in block 430, and then to block 440 to sort the number based on the assignment.

In this instance, the call was only received by the first user thus, the telephone message corresponding to this missed call may be assigned to the first group (i.e., no incoming telephone call was placed to the second user from the associated originating time as such telephone message was left). Likewise, this same assignment to the first group may be made to the telephone number, and the telephone number may be sorted to appear the earliest on the first user's caller ID list on his or her phone. Next, as already discussed, control may pass to block 450 to sort a corresponding message for playback based on the assignment, and then to block 460 to indicate the group assignment of the telephone message during playback. The corresponding message may be played back in block 470, and control may pass to block 310 to continue with the FOR loop.

If the call is also on the partner's caller ID, control passes to block 330 to determine if the call occurred within the time period, such as a similar time period. In some embodiments, the users may decide the length of the time, or the time may be automatically set by the system. The time may be in minutes, hours, etc. If the call was not within the set time period, control may pass to blocks 430, 440, 450, 460, 470, and 310 as described above.

If the call occurred within the time period, control may pass to block 340 to display the telephone number plus an indication such as C, A, R, or M based upon the bits that are turned on in the caller ID information table. A special icon before or after the number may be utilized for the indications. An indication of C may mean that the originating user called the second user (i.e., partner) as well but the second user did not return a call. An indication of R may mean that originating user called the second user and the second user returned the telephone call. An indication of M may mean that the originating user called the second user and left a telephone message for the second user. An indication of A may mean that originating user called second user and the second user answered the telephone call. Based on the indication, the first user may be able to quickly see from the displayed information if the second user (i.e., partner) has had contact with the originating user or has not had contact with the originating user.

Specifically, if block 350 determines the no bit in the caller ID information table is turned on, control passes to block 360 to indicate C. This may assign a corresponding message to the second group. If block 370 determines that the answer bit is on, control passes to block 380 to indicate A. This may assign a corresponding message to the third group. If block 390 determines that the return bit is on, control passes to block 400 to indicate R. This may assign a corresponding message to the third group. If block 410 determines that the message bit is on, control passes to block 420 to indicate M. This may assign a corresponding message to the second group.

Control may then pass to blocks 440, 450, 460, 470, and 310 as described above. Specifically, the telephone messages and telephone numbers assigned the second group may be sorted for playback and sorted in the displayed caller ID list after those in the first group, and those in the third group may be sorted for playback and sorted in the displayed caller ID list after those in the second group. Likewise, the group assignments may be indicated during playback and via an icon on the display.

Returning to block 410, if the message bit is not on, control may pass to block 310 to continue the FOR loop. Additionally, in some embodiments, when the display of caller ID information is requested by a telephone number that is associated with at least one other number, the request may be sent to server 44 to execute code that may accomplish the following:

For each number in the caller ID list (Incoming list)
   {For each partner
      {For each call between the partner and the number (in either incoming or outgoing list)
         {If (call occurred since current entry in caller ID list)
            {If (call was completed (i.e., Minutes used.))
               {Set partner returned indicator for entry in Caller ID list
               }}}}} Send partner returned flagged entries to requesting phone Additionally, a variety of modifications may be done to routine 300. For example, the ordering of telephone messages and telephone numbers may be based on other ordering criteria.

Figures 4, 5:
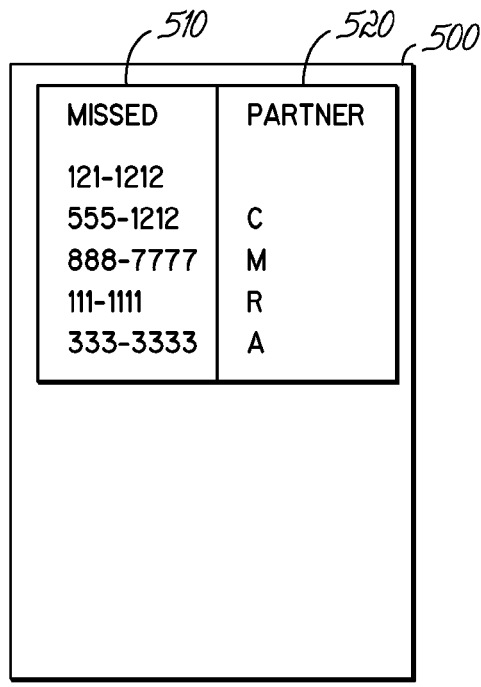
FIG. 4 is a block diagram of an example of a cellular telephone indicating the groups assigned to various telephone messages.
FIG. 5 is a block diagram of caller id information table utilized in the example of FIG. 4 for assigning the groups to the user.

FIG. 4 is a block diagram of an example of a cellular telephone 500 of a first user indicating to the first user the groups 520 assigned to various telephone numbers for missed calls as caller ID list 510. In this example, two or more users have associated themselves as partners for the purpose of cell phone service. The telephone numbers in caller ID list 510 are illustrated in order based on their group assignment. Additionally, in this example, there is a corresponding telephone message associated with each missed call, and the telephone messages have the same group assignment that is illustrated. Moreover, the messages are ordered for playback with the same order illustrated in FIG. 4.

FIG. 5 is a block diagram of caller id information table 530 utilized in the example of FIG. 4 for assigning and indicating the groups to the first user. Caller ID information table 530 has a record (i.e., columns 590, 600, 610, and 620) for incoming calls to the partner from the same telephone numbers (i.e., column 540) and bits specifying whether the originating user called the partner too at a similar time and the actions of the partner (i.e., columns 550, 560, and 570). Table 530 may also have other columns such as column 580 to keep track of the time of the calls. Thus, based on the bits that are turned on, the groups may be assigned and indications C, M, R, and A may be displayed. Table 530 may be updated as appropriate, and an update of table 530 may cause the order to be appropriately updated as well.

Those of ordinary skill in the art will appreciate that via the principles of the present invention, users may be better able to manage their time and prioritize missed calls and telephone messages much better, resulting in improved business results. In particular, it may be far more productive for the messages to be ordered such that the ones where there is no call to the partner are presented first, followed by the ones that the partner has not returned, and lastly the ones that the partner has called or talked to since the message was received. This may allow for the more efficient processing of the messages. Furthermore, those of ordinary skill in the art will appreciate that despite the associations between telephone numbers for two or more users, the privacy of individual phones and messages may still be maintained.

Various modifications may be made to the illustrated embodiments without departing from the spirit and scope of the invention. For instance, blocks may be removed or repositioned in routines 100 and/or 300. In particular, in some embodiments, blocks 440-470 may be in FIG. 2 with a "Listen to Messages" decision block after block 270 and before block 280; thus, separating the displaying caller ID info and the listening to messages functionalities. As such, if the event is not to listen to messages, then control may pass to block 280. Otherwise, control may pass to blocks 440-470. Other modifications may also be made consistent with the invention. Therefore, the invention lies in the claims hereinafter appended.

What is claimed is:

1. A method of ordering telephone messages left for a first user having a first telephone number, the method comprising:
associating the first telephone number with a second telephone number of a second user that has a relationship with the first user;
tracking incoming and outgoing telephone calls to and from the first and second telephone numbers;
storing a plurality of telephone messages received by the first user in response to a plurality of missed incoming telephone calls to the first telephone number, wherein each telephone message is associated with an originating user;
for each telephone message among the plurality of telephone messages, assigning such telephone message to one of first, second, and third groups, including:
assigning such telephone message to the first group in response to determining that no incoming telephone call was placed to the second user from the associated originating user within a time period relative to when as such telephone message was left;
assigning such telephone message to the second group in response to determining that an incoming telephone call was placed to the second user from the associated originating user within a time period relative to when as such telephone message was left, but that the second user has not been in contact with the associated originating user since such telephone message was left; and
assigning such telephone message to the third group in response to determining that an incoming telephone call was placed to the second user from the associated originating user within a time period relative to when as such telephone message was left, and that the second user has been in contact with the associated originating user since such telephone message was left; and
sorting the plurality of telephone messages for playback such that each telephone message in the first group is ordered earlier than each telephone message in the second group, and such that each telephone message in the second group is ordered earlier than each telephone message in the third group.

2. The method of claim 1, further comprising determining that the second user has been in contact with the associated originating user for a telephone message in response to determining that the second user answered the incoming telephone call placed to the second user from the associated originating user within a time period relative to when as such telephone message was left.

3. The method of claim 1, further comprising determining that the second user has been in contact with the associated originating user for a telephone message in response to determining that the second user initiating an outgoing call to the associated originating user subsequent to when such telephone message was left.

4. The method of claim 1, further comprising determining that the second user has not been in contact with the associated originating user in response to determining that the second user has not initiated an outgoing call to the associated originating user subsequent to when such telephone message was left.

5. The method of claim 1, further comprising indicating to the first user in association with playback of a telephone message from among the plurality of telephone messages whether an incoming telephone call was placed to the second user from the associated originating user within a time period relative to when as such telephone message was left, and whether the second user has been in contact with the associated originating user since such telephone message was left.

6. The method of claim 1, further comprising indicating to the first user in association with displaying an originating telephone number from an originating user to the first user in a caller ID list, whether an incoming telephone call was placed to the second user from the originating user, and whether the second user has been in contact with the associated originating user.

7. The method of claim 1, wherein tracking incoming and outgoing telephone calls further comprises utilizing a server, wherein the server contains at least one of caller ID information or billing information.

8. The method of claim 1, wherein assigning the plurality of telephone messages to one of the first, second, and third groups further comprises utilizing a server, wherein the server contains at least one of a caller ID information or billing information.

9. The method of claim 1, further comprising resorting at least one telephone message in the plurality of telephone messages in response to determining that the second user has been in contact with the associated originating user since such telephone message was left, wherein resorting the telephone message further comprises reassigning the telephone message to the third group from the second group.

10. The method of claim 1, further comprising indicating to the first user in association with displaying an originating telephone number from an originating user to the first user in a caller ID list, the group assigned to the telephone message associated with the original telephone number.

11. The method of claim 1, further comprising:
sorting an originating telephone number in a caller ID list based upon the group assigned to a corresponding telephone message in association with displaying the originating telephone number from an originating user to the first user in the caller ID list; and
displaying the originating telephone number from the originating user to the first user in the caller ID list, wherein the order of the originating telephone number in the caller ID list indicates the order of the corresponding telephone message for playback.

* * * * *